INVENTOR.
JOHN LELIS
BY M. Ralph Shaffer
HIS ATTORNEY

April 28, 1964 J. LELIS 3,130,580
TESTING STAND
Filed April 28, 1960 2 Sheets-Sheet 2

INVENTOR.
JOHN LELIS
BY M. Ralph Shaffer
HIS ATTORNEY

United States Patent Office 3,130,580
Patented Apr. 28, 1964

3,130,580
TESTING STAND
John Lelis, 231 W. 6750 South, Bountiful, Utah
Filed Apr. 28, 1960, Ser. No. 25,430
10 Claims. (Cl. 73—118)

This invention relates to the provision of a testing stand for locking the stator or housing of a machine to be tested in securement while selectively driving the rotor of the machine so as to perform certain tests in connection therewith and, more particularly, provides a new and improved testing stand adapted to accommodate the securement and driving of any one of a number of automatic transmissions of the automotive type so that these transmissions may be subjected to a variety of tests under simulated driving conditions.

An object of the present invention is to provide a testing stand type machine which may be easily aligned in a minimum set-up time.

A further object of the present invention is to provide a testing stand wherein the power plant, the means for securing machine housings, and perhaps the tail stock also of the testing stand may be in respective fixed positions, with the drive shaft of the testing machine being translationally displaceable, yet keyed to the power plant thereof, for accommodating various types of machines to be tested.

An additional object of the present invention is to provide a testing stand of the type described which will readily lend itself to testing automatic transmissions of the automotive type, in which the stand is supplied means for retaining one of a selected number of interchangeable adapter plates, each designed to secure in test position the housings of one or more automatic transmissions.

A further object is to provide an alignment tool wherein alignment of the bearing structure of the testing stand with the adapter plate mounting means may be accomplished in a very short time, and this notwithstanding the extremely close tolerances which can be realized.

In accomplishing the above objects the present invention embodies the principle that, in order for a machine of the type described to accommodate the great variety of automatic transmissions on the market at the present time and to be anticipated in the future and to require the employment of as few a number of adapter mounting plates and rotor drive connections as possible, either the means which mounts the transmission housing must be movable (see the inventor's Patent No. 3,075,381, filed December 14, 1959) or the drive means must be translationally displaceable along its axis of rotation. The latter is the approach taken by this invention.

With this in mind, it will be seen that the central purpose of the instant design is to adapt the testing stand to receive the front end of all automatic transmissions with the least possible number of adapters, so as to enable the transmission "housing," be it a bell housing or a main case housing, to be held on centerline separately from the drive (including the converter adapter, if used), both being concentric and squared with respect to each other during performance. Additionally a converter adapter, if required for use, will be secured between the drive and the transmission rotor in a proper depth engagement, by appropriately adjusting the drive. Hence, it will be seen that testing may be accomplished with a minimum time requirement for substituting automatic transmissions for mounting on the instant testing stand.

As to results achieved, it will be seen with reference to this and the inventor's copending case (supra) that (1) adapter plates employed need be only of one thickness and of reduced number; (2) the adapters will be of simple form, i.e. circles, horse shoes, and small circles; (3) one universal drive plate having a duo- or multi-slot pattern (with same starting point) need be employed (with a simple, center pick-up bushing and one or more, permissably included sets of mounting spacers) to drive all converter-type transmissions. See the inventor's copending case.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

Figure 1:
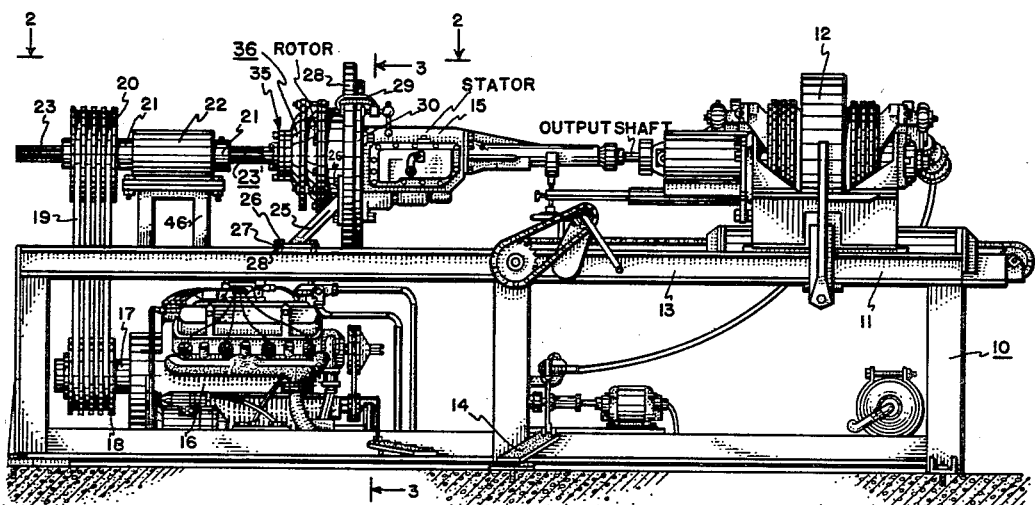
FIGURE 1 is a side elevation of the testing stand incorporating the present invention.
Figure 2:
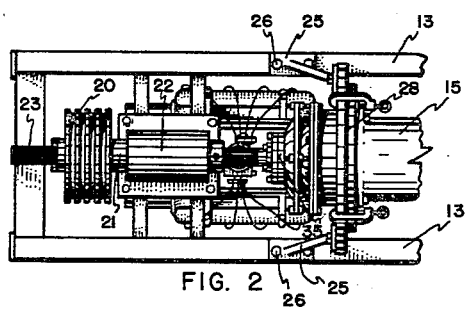
FIGURE 2 is a fragmentary top plan of the testing stand shown in FIGURE 1 and is taken along the line 2—2 in FIGURE 1.

In FIGURE 1 the test stand 10 of the invention includes a frame 11 having mounted thereon an inertial tail stock 12 which is slideable back and forth along the I-beams 13 of frame 11. The inertial tail stock 12 is supplied with braking system 14. All of the above is conventional and requires no further discussion. See the inventor's Patent No. 3,075,381, entitled Testing Stand, filed December 14, 1959, which is fully incorporated herein by way of reference. It will readily be understood that instead of having a tail stock of translatable character one may provide a fixed disposition tail stock which is supplied merely with a telescoping drive line for connection to the output end of the automatic transmission or other machine to be tested. All of this is strictly conventional.

The improvement in test stands which is the subject of this invention is found in the structure shown in FIGURE 1 to the left of the main part of the automatic transmission 15 which is being tested.

First of all, it is to be noted that the power plant 16 is disposed within the frame 11 and includes output shaft 17 which is provided with pulley system 18. A plurality of belts 19 engage the pulley system 18 and loop around the pulley system 20 fixedly mounted upon the sleeve 21.

Figure 7:
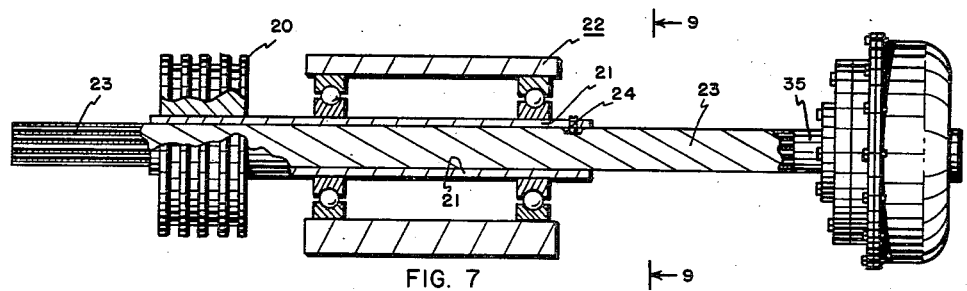
FIGURE 7 is an enlarged elevation, principally in section, of the drive shaft and bearing member combination of the invention.
Figure 9:
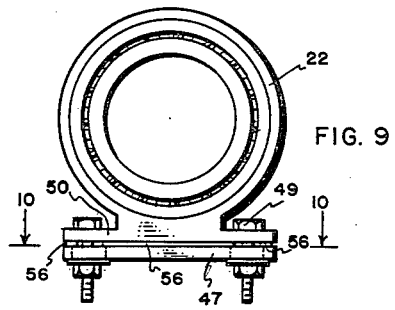
FIGURE 9 is a view taken along the line 9—9 in FIGURES 7 and 8 and illustrates a front elevation of one type of bearing member which may be used with the invention.
Figure 11:
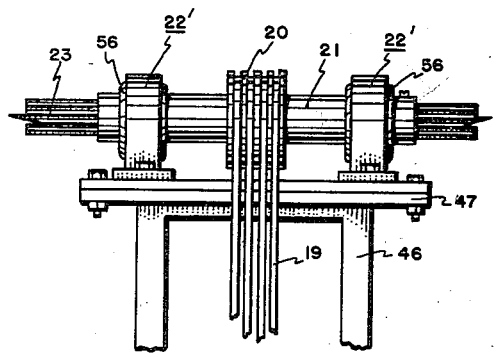
FIGURE 11 is a fragmentary view of the equipment when the same incorporates a split bearing arrangement so as to enable pulley connection to the center of the drive sleeve of the structure.
Figure 10:
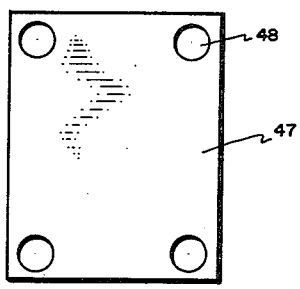
FIGURE 10 is a view taken along the line 10—10 in FIGURE 9 and illustrates the top plan of the plate which constitutes the mounting seat for the bearing member.

As shown in FIGURES 1 and 7, sleeve 21 is rotatably mounted within bearing member 22, the latter constituted either by a simple bearing structure as shown at 22 in FIGURE 7 or by the self-aligning bearing, split structure as illustrated at 22' in FIGURE 11. In any event, drive shaft 23 is keyed to sleeve 21, preferably by the two being externally and internally splined, respectively, as shown. A bronze-tipped set screw 24 (or other locking means such as a collet) secures drive shaft 23 within sleeve 21 so that drive shaft 23 will not be translationally displaced along its axis inadvertently with respect to sleeve 21. At this point it is well to consider the reason for the provision of locking means 24 and of sleeve 21 and drive shaft 23 keyed thereto. It is well known to those skilled in the art that automatic transmissions which may be tested by such a machine as the present one will vary not only in overall length and general character, but also in the distance between the mounting flange of the housing and the input connection to the rotor of the transmission. Further, there are transmissions of "bell-housing" type (requiring a drive plate connection) and those which do not self-contain a fluid converter (and for which a fluid converter, rather than a drive plate, must be supplied). Thus, it is highly desirable that drive shaft 23 be longitudinally translatable so as to accommodate transmissions of various sizes. This adjustable feature of shaft 23, it is to be noted, in no way affects the drive connections of the power plant 16 to drive shaft 23; rather, the same remains intact. Thus, merely a simple turning of set screw 24 will be sufficient to enable the selectable displacement of drive shaft 23 so as to accommodate various transmissions.

FIGURE 1 illustrates the frame 11 to be provided with flanged brackets 25 and attachments 26. The flanges of brackets 25 may be provided with enlarged mounting apertures 27 (or the I-beams 13 be supplied with an elongated aperture 28) so that the mounting of adapter mounting member 28 to frame 13 may be adjusted during the setting up of the equipment. This setting up process will be described hereinafter. It suffices to say now that brackets 25 will be bolted or otherwise secured to adapter mounting member 28 by means of attachments 26 and by the use of enlarged apertures if desired. Clamps 29 are provided to clamp a selected one of the innerchangeable adapter plates 30 to member 28. See the inventor's copending case, supra. As therein taught, the adapter plates 30 have respective, rotor drive access apertures A and are provided to enable the respective mounting to each adapter plate of one or more machine (e.g. automatic transmission) housings. The number of housings which can be accommodated by a single adapter plate will be determined by the hole spacing for dowel pins and/or studs for example and the number of such patterns which each adapter plate might accommodate; also, the apertures A of the respective adapter plates will be so dimensioned to provide access for the rotor drive, including the rotor also, where the latter is of a type which protrudes past that portion of its transmission housing which is to be secured to the respective adapter plate. Aperture A' of adapter mounting member 28 will admit all protruding rotors of all transmissions to be tested. Thus, the number of transmission housings which can be mounted upon the particular adapter plate 30 disposed within member 28 (see FIGURES 1 and 3) is limited merely by the extent of the various hole patterns of the transmission housings which are to be accommodated, together with the permissible closeness of these patterns.

Figure 3:
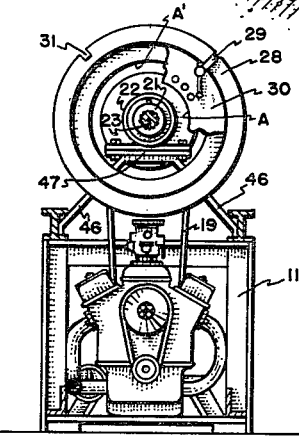
FIGURE 3 is a vertical section taken along the line 3—3 in FIGURE 1.
Figure 8:
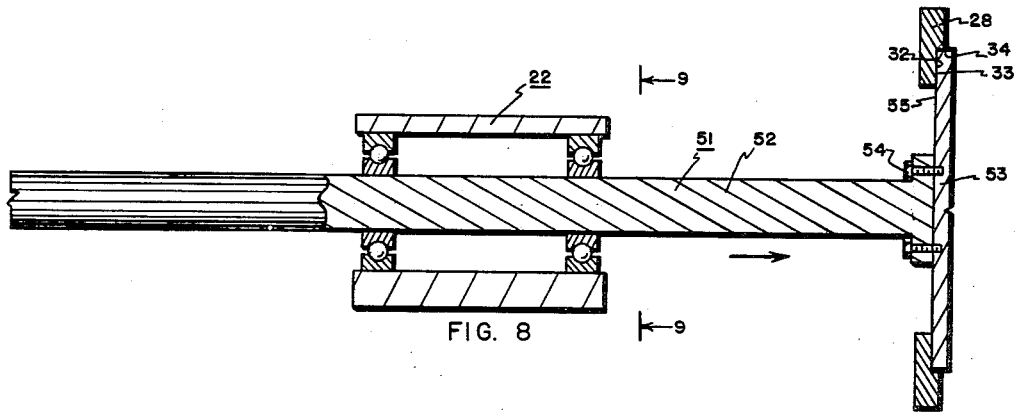
FIGURE 8 is an enlarged elevation, principally in section, of the testing tool which is used to align the equipment of the invention.

As shown in FIGURES 3 and 8, the adapter mounting member 28 has rotor access area or aperture A' and preferably includes clamp slots 31 for accommodating the various clamps 29 (the latter of which secures the several adapter plates employed to member 28) and also a recessed seat 32 which preferably has squared surfaces 33 and 34. (However, if desired, surface 34 may be outwardly tapered so as to receive, easily, inwardly tapered adapter plates.)

Figure 5:
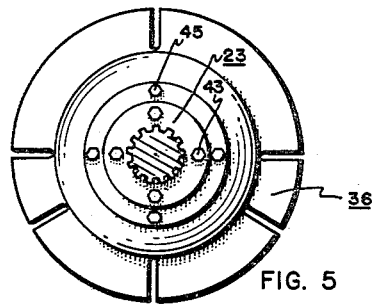
FIGURE 5 is a plan view of the drive plate aforementioned and is taken along the line 5—5 of FIGURE 4.
Figure 6:
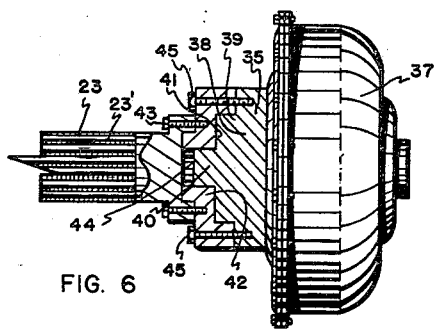
FIGURE 6 is an enlarged fragmentary elevation, partially in section, of the work end of the drive shaft of the present invention when the same is constituted by a converter unit secured to the shaft proper, the converter unit being adapted for connection to automatic transmissions of the non-bell housing type (i.e. those which do not self-contain their fluid converter unit).
Figure 4:
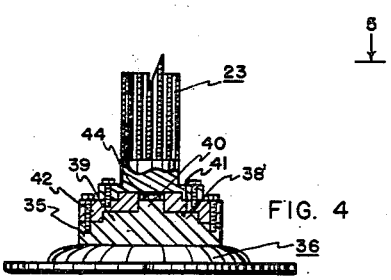
FIGURE 4 is an enlarged, fragmentary elevation, partially in section, of the work end of the drive shaft of the testing stand, this end being constituted by a drive plate bolted to the shaft proper; the drive plate shown is adapted for mechanical connection to the fluid unit of a bell-housing type, automatic transmission.

Turning now to a consideration of the work end portion 35 (see, in particular, FIGURES 4-6) it will be seen that this work end portion may comprise either a universal drive plate 36, for connection to bell-housing type transmission rotors, or in a fluid converter connection 37 which is adapted for non-bell-housing type transmissions. The center pick-up, aft portions 38 and 38' of universal drive plate 36 and fluid converter 37 preferably are identical, both in the provision of a squared shoulder 39 and in a stub shaft portion 40. Shaft length 23' of drive shaft 23 includes a corresponding shoulder 41 (in the provision of ring fitting 42 which is secured to shaft length 23' by means of bolts 43) and a receiving aperture 44. Thus, the removal of bolts 45 will release the fluid unit 37 from shaft 23 and permit the substitution of universal drive plate 36.

In FIGURE 1 the universal drive plate 36 is shown connected to shaft length 23' to form drive shaft 23. For non-bell-housing types of transmissions a fluid converter 37 may be substituted for universal drive plate 36 so that the apparatus of FIGURE 1 utilizes the end connection shown in FIGURE 6.

FIGURES 3, 9–11 illustrate that the frame 11 includes an upper framework 46 to which a plate 47 is secured. Plate 47 includes a plurality of over-sized holes 48 and in fact constitutes a seat for bearing member 22. Attachments 49 are also supplied so that bearing member 22 may be easily secured to the seat plate 47. Accordingly, to align the bearing member 22 (hereinafter described) shims 56 may be inserted between the base flange 50 of bearing member 22 and seat plate 47, with the bearing member 22 being movable about seat plate 47 as enabled by enlarged holes 48 so as to accomplish alignment.

The subject of alignment will now be discussed. See FIGURE 8. The tool 51 used to accomplish alignment of equipment is composed of a dead-centered shaft 52 and a machined flange or plate 53 bolted to the former by means of bolts 54. The flange 53 has a machined rear surface 55 which is perfectly square with respect to the shaft 52. Thus, for alignment the tool 51 initially replaces shaft 23 (and perhaps sleeve 21 also) of the original equipment and is tightly fitted into bearing member 22. At this time the adapter mounting member 28, provided with cylindrical recessed seat 32, is positioned so that surface 33 is disposed directly against the machined surface 55 of the tool. The outer periphery of flange 53 and the surface 34 of seat 32 are substantially equivalent (with the permissible tolerance of the order of one thousandth of an inch) so that the adapter mounting member 28 is now in substantial alignment. The attachments 26 associated with brackets 25 are tightened down and the adapter plate mounting member 28, bracket 25, frame 11 combination is electric welded together. At this point the tool 51 will be translated slightly to the right and a conventional dial indicator attached to the tool so as to sweep, alternately, the surfaces 32 and 34 of adapter mounting member 28. Precise alignment by use of the dial indicator will be made by shimming up the bearing member 22 as necessary by use of shims 56 in FIGURE 9. This is made necessary since the tightening down and electric welding securement of adapter mounting member 28 will cause some misalignment in mounting member 28 relative to bearing member 22. Thus, to recapitulate, the coarse alignment of the equipment is made by clamping flange 53 of the tool 51 against member 28, by electric welding member 28 in place; final alignment is accomplished by sweeping surfaces 33 and 34 by a dial indicator and by shimming bearing member 22 as needed.

Once alignment is completed the tool 51 is removed and the drive shaft 23 (with its sleeve 21 if previously removed) is again inserted in position, and the equipment is ready for use. Tolerance existing between spline sleeve 21 and spline shaft 23 will serve in effect as a double unit universal joint so as to lend a degree of flexibility to the system.

Where the split bearing construction of FIGURE 11 is used, then the outer races 56 should be of the self-aligning ball type so that binding will be avoided.

It will be understood that the extensible and withdrawable drive means comprising, e.g., sleeve 21 and drive shaft 23 may be provided in a way other than that shown. Thus, a sleeve could be translatable and be supplied with the work end portion and the "drive shaft" (23) keyed to the sleeve and driven by power plant 16. Other ways of accomplishing the adjustable drive might also suggest themselves without departing from the scope of this invention.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A testing stand for testing machines having housings and rotors of differing character and respective output shafts, including, in combination: a frame having a bearing member seat; a bearing member; means mounting said bearing member upon said seat; a sleeve journaled within said bearing member for rotation therewith; a power plant having an output shaft; means interconnecting said output shaft of said power plant with said sleeve for rotating said sleeve about its axis; a drive shaft coaxially disposed within and keyed to said sleeve, said drive shaft being selectively translatable along the axis of said sleeve and having a work end portion adapted for coupling to the rotor of a machine to be tested; means for fixing the longitudinal disposition of said drive shaft with respect to said sleeve; means affixed to said frame for fixedly mounting housings of particular machines to be tested, this means having a rotor drive access area; and a tail stock coaxially disposed with respect to said drive shaft within said sleeve for receiving the output shaft of the machine to be tested; and wherein said bearing member is adjustably alignable upon said seat.

2. A testing stand for testing machines having housings and rotors of differing character and respective output shafts, including, in combination: a frame having a bearing member seat; a bearing member; means mounting said bearing member upon said seat; a sleeve journaled within said bearing member for rotation therewithin; a power plant having an output shaft; means interconnectsaid output shaft of said power plant with said sleeve for rotating said sleeve about its axis; a drive shaft coaxially disposed within and keyed to said sleeve, said drive shaft being selectively translatable along the axis of said sleeve and having a work end portion adapted for coupling to the rotor of a machine to be tested; means for fixing the longitudinal disposition of said drive shaft with respect to said sleeve; means affixed to said frame for fixedly mounting housings of particular machines to be tested, this means having a rotor drive access area; and a tail stock coaxially disposed with respect to said drive shaft within said sleeve for receiving the output shaft of the machine to be tested; and wherein said testing stand includes means for aligning said bearing member upon said bearing member seat of said frame.

3. A testing stand for testing machines having housings and rotors of differing character and respective output shafts, including, in combination: a frame having a bearing member seat; a bearing member; means mounting said bearing member upon said seat; a sleeve journaled within said bearing member for rotation therewithin; a power plant having an output shaft; means interconnectsaid output shaft of said power plant with said sleeve for rotating said sleeve about its axis; a drive shaft coaxially disposed within and keyed to said sleeve, said drive shaft being selectively translatable along the axis of said sleeve and having a work end portion adapted for coupling to the rotor of a machine to be tested; means for fixing the longitudinal disposition of said drive shaft with respect to said sleeve; means affixed to said frame for fixedly mounting housings of particular machines to be tested, this means having a rotor drive access area; and a tail stock coaxially disposed with respect to said drive shaft within said sleeve for receiving the output shaft of the machine to be tested; and wherein said housing mounting means is adjustably alignable upon said frame.

4. A testing stand for testing machines having housings and rotors of differing character and respective output shafts, including, in combination: a frame having a bearing member seat; a bearing member; means mounting said bearing member upon said seat; a sleeve journaled within said bearing member for rotation therewithin; a power plant having an output shaft; means interconnecting said output shaft of said power plant with said sleeve for rotating said sleeve about its axis; a drive shaft coaxially disposed within and keyed to said sleeve, said drive shaft being selectively translatable along the axis of said sleeve and having a work end portion adapted for coupling to the rotor of a machine to be tested; means for fixing the longitudinal disposition of said drive shaft with respect to said sleeve; means affixed to said frame for fixedly mounting housings of particular machines to be tested, this means having a rotor drive access area; and a tail stock coaxially disposed with respect to said drive shaft within said sleeve for receiving the output shaft of the machine to be tested; and wherein said testing stand includes means for effectuating the initial, rough alignment of said housing mounting means with respect to said bearing member, and means for effectuating the fine alignment of said bearing means with respect to said housing mounting means.

5. A testing stand for testing machines having housings and rotors of differing character and respective output shafts, including, in combination: a frame having a bearing member seat; a bearing member; means mounting said bearing member upon said seat; a sleeve journaled within said bearing member for rotation therewithin; a power plant having an output shaft; means interconnectsaid output shaft of said power plant with said sleeve for rotating said sleeve about its axis; a drive shaft coaxially disposed within and keyed to said sleeve, said drive shaft being selectively translatable along the axis of said sleeve and having a work end portion adapted for coupling to the rotor of a machine to be tested; means for fixing the longitudinal disposition of said drive shaft with respect to said sleeve; means affixed to said frame for fixedly mounting housings of particular machines to be tested, this means having a rotor drive access area; and a tail stock coaxially disposed with respect to said drive shaft within said sleeve for receiving the output shaft of the machine to be tested; and wherein said testing stand includes means for effectuating the desired alignment of said housing mounting means.

6. A testing stand for testing machines having housings and rotors of differing character and respective output shafts, including, in combination: a frame having a bearing member seat; a bearing member; means mounting said bearing member upon said seat; a sleeve journaled within said bearing member for rotation therewithin; a power plant having an output shaft; means interconnecting said output shaft of said power plant with said sleeve for rotating said sleeve about its axis; a drive shaft coaxially disposed within and keyed to said sleeve, said drive shaft being selectively translatable along the axis of said sleeve and having a work end portion adapted for coupling to the rotor of a machine to be tested; means for fixing the longitudinal disposition of said drive shaft with respect to said sleeve; an adapter mounting member mounted to said frame and provided with a rotor access aperture; a selected one of a plurality of interchangeable adapter plates, for fixedly mounting the housings of various types of machines to be tested, releasably affixed to said mounting member, each of said adapter plates having a rotor drive access aperture and means for mounting at least one type of machine housing thereto; and a tail stock coaxially disposed with respect to said adapter plate aperture and said drive shaft within said sleeve and adapted to receive the output shaft of the machine to be tested.

7. Structure according to claim 6 wherein said testing stand includes first means for effectuating the rough, transverse alignment of said adapter mounting member with respect to said bearing member and second means for effectuating the fine alignment of said bearing member with respect to said adapter mounting member.

8. A testing stand according to claim 6 wherein said adapter mounting member has a recessed seat for receiving said adapter plates, the selected one of said adapter plates being affixed to said adapter mounting member within said seat.

9. A testing stand comprising a frame having a bearing member seat; a bearing member; means mounting said bearing member upon said seat; a sleeve journaled within said bearing member for rotation therewithin; a power plant having an output shaft; means interconnecting said output shaft of said power plant with said sleeve for rotating said sleeve about its axis; a drive shaft coaxially disposed within and keyed to said sleeve, said drive shaft being selectively translatable along the axis of said sleeve and having a work end portion adapted for coupling to the rotor of a machine to be tested; means for fixing the longitudinal disposition of said drive shaft with respect to said sleeve; an adapter mounting member mounted to said frame and provided with a rotor access aperture; a selected one of a plurality of interchangeable adapter plates, for fixedly mounting the housings of various types of machines to be tested, releasably affixed to said mounting member, each of said adapter plates having a rotor drive access aperture and means for mounting at least one type of machine housing thereto; a tail stock coaxially disposed with respect to said adapter plate aperture and said drive shaft within said sleeve and adapted to receive the output shaft of the machine to be tested; and aligning tool comprising a test shaft to be substituted for said drive shaft within said bearing member; and a transverse test flange affixed to said test shaft and having a bearing surface against which said adapter mounting member is secured preliminary to final securement of said adapter mounting member to said frame.

10. The tool of claim 9 in combination with said testing stand wherein said adapter mounting member is provided with a recessed seat for receiving a selected one of a set of interchangeable adapter plates, said transverse test flange of said tool temporarily fitting into said recessed seat.

References Cited in the file of this patent

UNITED STATES PATENTS

| | | |
|---|---|---|
| 1,541,083 | Walker | June 9, 1925 |
| 1,839,134 | Van Degrift | Dec. 29, 1931 |
| 2,412,473 | Schnoebelen | Dec. 10, 1946 |
| 2,918,822 | Mann | Dec. 29, 1959 |
| 3,060,730 | Lucia | Oct. 30, 1962 |